United States Patent
Jain et al.

(10) Patent No.: US 9,815,052 B2
(45) Date of Patent: Nov. 14, 2017

(54) FLUID DISPENSING DEVICE INCLUDING A VALVE ASSEMBLY FLUIDICALLY COUPLED TO A FIRST AND SECOND INLET, AND TO A FIRST AND SECOND OUTLET

(71) Applicants: Ajay Jain, Lucknow (IN); Atul Jain, Lucknow (IN); Aviral Jain, Lucknow (IN)

(72) Inventors: Ajay Jain, Lucknow (IN); Atul Jain, Lucknow (IN); Aviral Jain, Lucknow (IN)

(73) Assignees: Ajay Jain, Lucknow (IN); Atul Jain, Lucknow (IN); Aviral Jain, Lucknow (IN)

( * ) Notice: Subject to any disclaimer, the term of this patent is extended or adjusted under 35 U.S.C. 154(b) by 192 days.

(21) Appl. No.: 14/715,346

(22) Filed: May 18, 2015

(65) Prior Publication Data
US 2016/0039657 A1 Feb. 11, 2016

(30) Foreign Application Priority Data
Aug. 8, 2014 (IN) .......................... 2262/DEL/2014

(51) Int. Cl.
*B01L 3/02* (2006.01)
*G01F 11/02* (2006.01)
*B01F 15/04* (2006.01)

(52) U.S. Cl.
CPC ........... *B01L 3/0206* (2013.01); *B01L 3/0265* (2013.01); *G01F 11/021* (2013.01);
(Continued)

(58) Field of Classification Search
CPC ........ B01L 2300/087; B01L 2200/026; B01L 2200/0605; B01L 2200/0621; B01L 2200/16; B01L 2300/0861; B01L 2400/0478; B01L 2400/0633; B01L 3/0206; B01L 3/0265; B01L 2300/049; B01L 2400/0616; B01L 2400/0622;
(Continued)

(56) References Cited

U.S. PATENT DOCUMENTS 1,820,210 A * 8/1931 Barker ................... B03D 1/145
                                                     137/268
2,614,742 A * 10/1952 Price ....................... B67C 3/16
                                                     141/45

(Continued)

*Primary Examiner* — Patrick M Buechner
(74) *Attorney, Agent, or Firm* — Harness, Dickey & Pierce, P.L.C.

(57) ABSTRACT

A fluid dispensing device includes a dispensing cylinder, a first inlet and a second inlet. The first inlet is disposed within a first container on which the fluid dispensing device is mounted. The first inlet and the second inlet are configured to facilitate intake of only one fluid into the dispensing cylinder at a given point in time. The fluid dispensing device also includes a first outlet and a second outlet. The first outlet and the second outlet are configured to dispense only one fluid out of the dispensing cylinder at a given point in time. The fluid dispensing device further includes a valve assembly fluidically coupled to the first inlet and the second inlet, and to the first outlet and the second outlet. The valve assembly is configured to control flow of the fluids within and/or out of the dispensing cylinder.

13 Claims, 6 Drawing Sheets

(52) U.S. Cl.
CPC ........ *G01F 11/028* (2013.01); *B01F 15/0454* (2013.01); *B01L 2200/026* (2013.01); *B01L 2200/0605* (2013.01); *B01L 2200/0621* (2013.01); *B01L 2200/16* (2013.01); *B01L 2300/049* (2013.01); *B01L 2300/0861* (2013.01); *B01L 2400/0478* (2013.01); *B01L 2400/0616* (2013.01); *B01L 2400/0622* (2013.01); *B01L 2400/0633* (2013.01); *B01L 2400/0666* (2013.01)

(58) Field of Classification Search
CPC ......... B01L 2400/0666; B01F 15/0454; B01F 15/0462; G01F 11/021; G01F 11/028
USPC ..... 137/571, 572, 625.4, 597; 422/514, 515, 422/516, 521, 572
See application file for complete search history.

(56) References Cited

U.S. PATENT DOCUMENTS

| | | | | |
|---|---|---|---|---|
| 2,966,861 A * | 1/1961 | Stewart | ............... | F04B 9/14 222/385 |
| 3,012,863 A * | 12/1961 | Feichtmeir | ............ | B01L 3/0206 422/514 |
| 3,067,915 A * | 12/1962 | Shapiro | ............... | B01L 3/0206 222/255 |
| 3,186,808 A * | 6/1965 | Anscherlik | ............... | B01J 4/02 137/602 |
| 3,273,402 A * | 9/1966 | Farr | ............... | B01L 3/0206 137/860 |
| 3,476,518 A * | 11/1969 | Jungner | ............... | B01L 3/0206 137/625.19 |
| 3,715,061 A * | 2/1973 | Morine | ............... | F01L 25/063 222/334 |
| 3,752,197 A * | 8/1973 | Ambrose | ............... | B01L 3/0206 134/22.1 |
| 3,955,930 A * | 5/1976 | Shapiro | ............... | G01N 1/38 222/135 |
| 3,990,312 A * | 11/1976 | Koukol | ............... | B01L 3/0206 422/921 |
| 4,141,469 A * | 2/1979 | Lee | ............... | B01L 9/54 222/135 |
| 5,141,137 A * | 8/1992 | Knodel | ............... | B05B 11/0018 222/309 |
| 6,063,339 A * | 5/2000 | Tisone | ............... | B01J 19/0046 422/509 |
| RE38,281 E * | 10/2003 | Tisone | ............... | B01L 3/0265 118/305 |

* cited by examiner

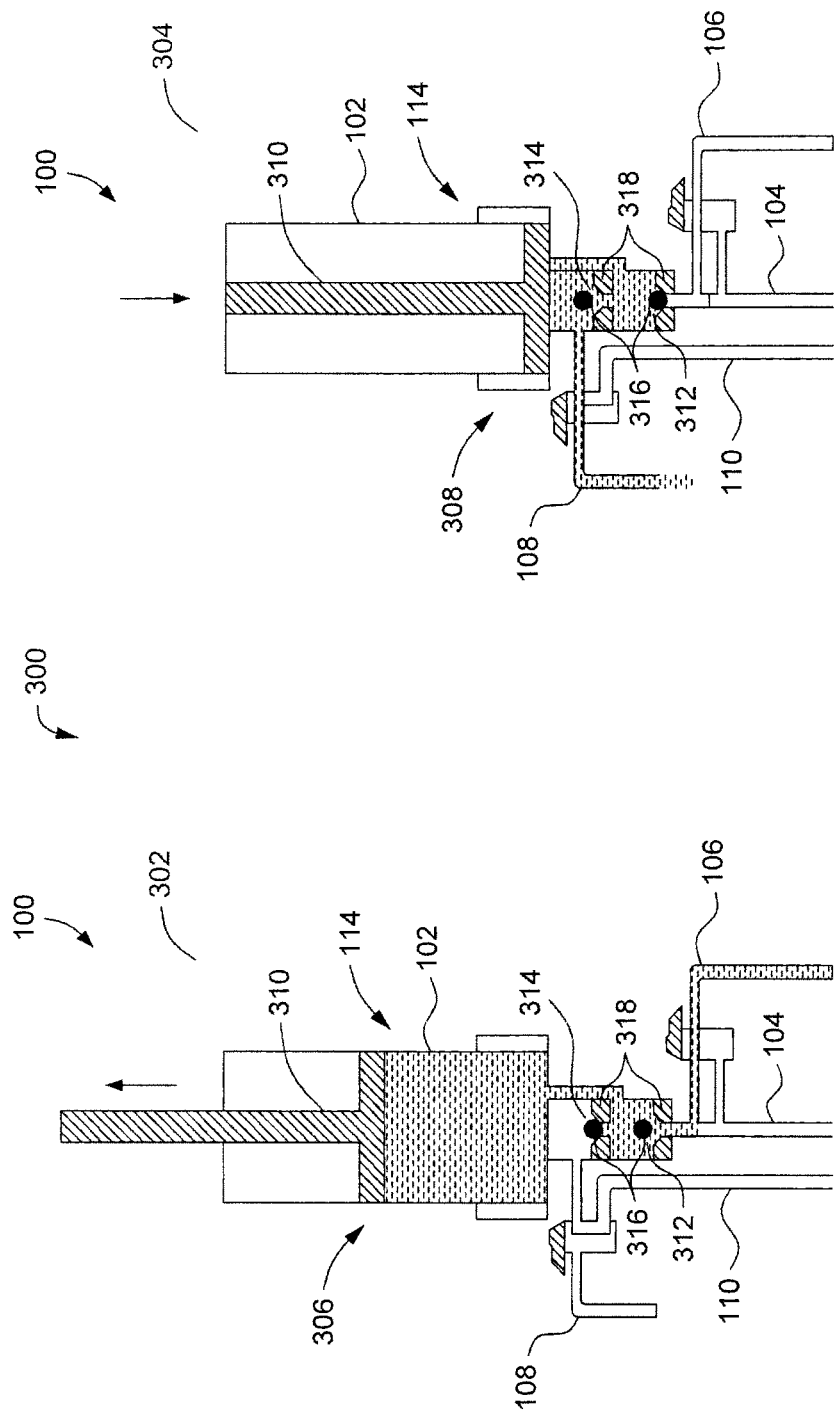

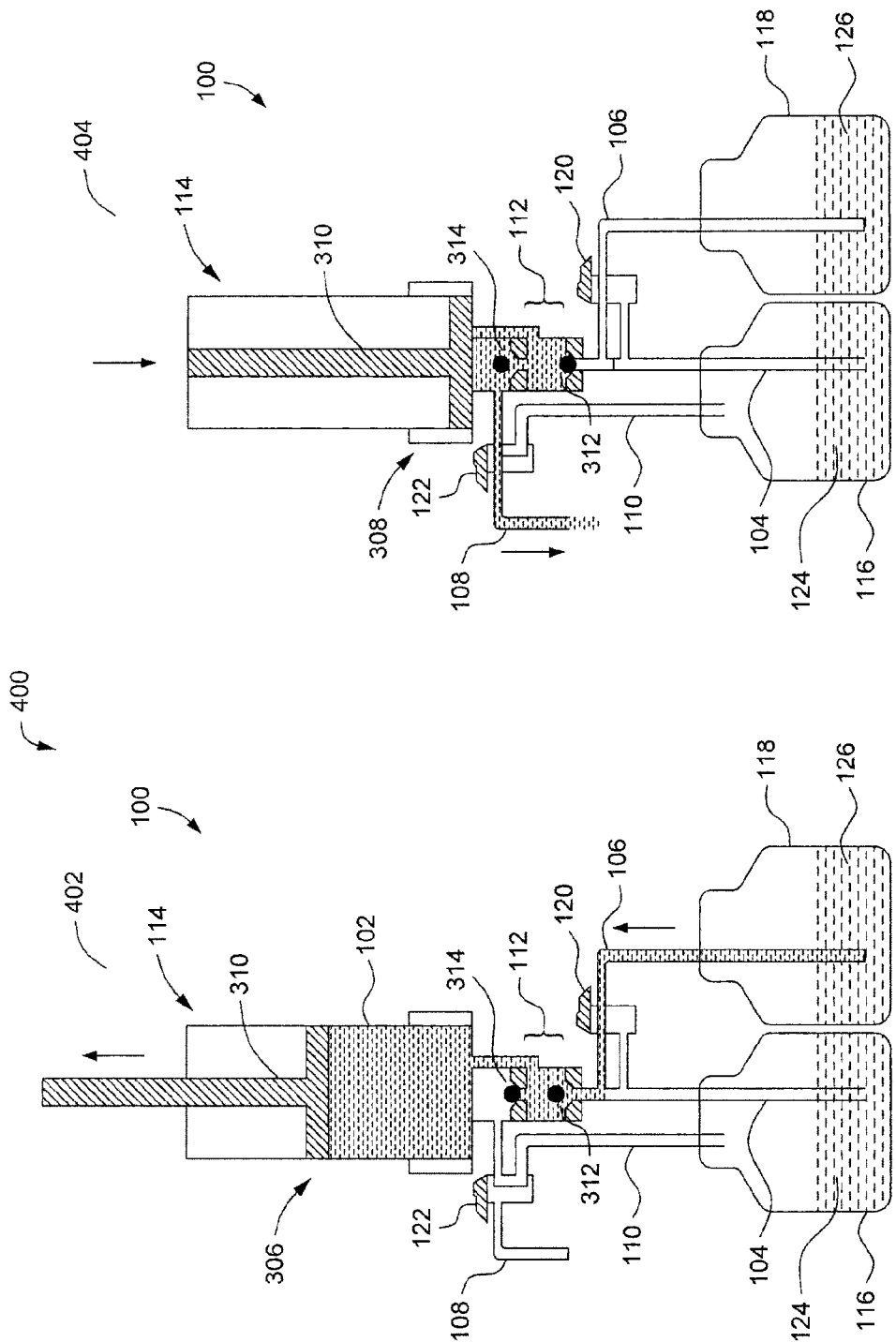

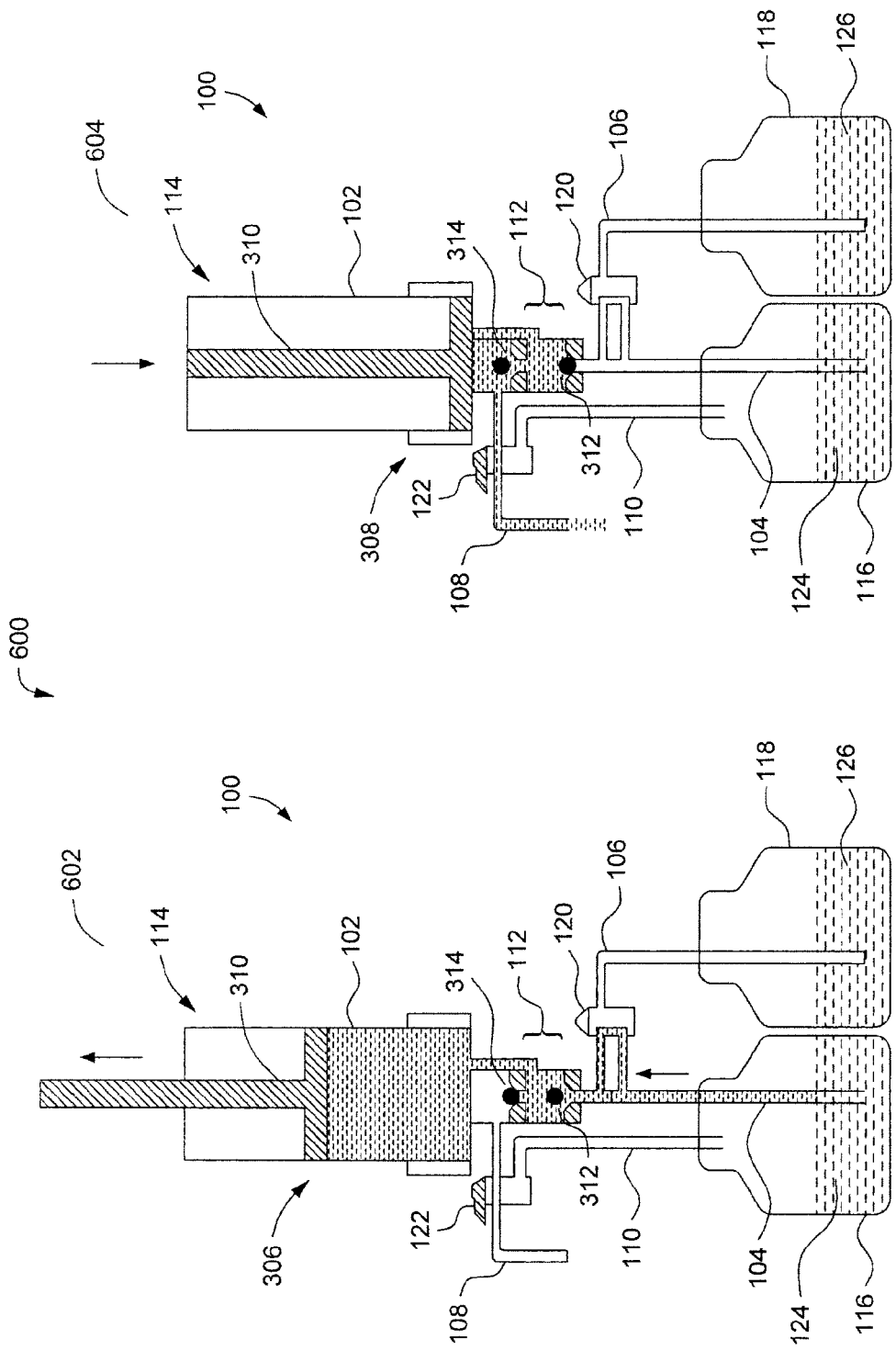

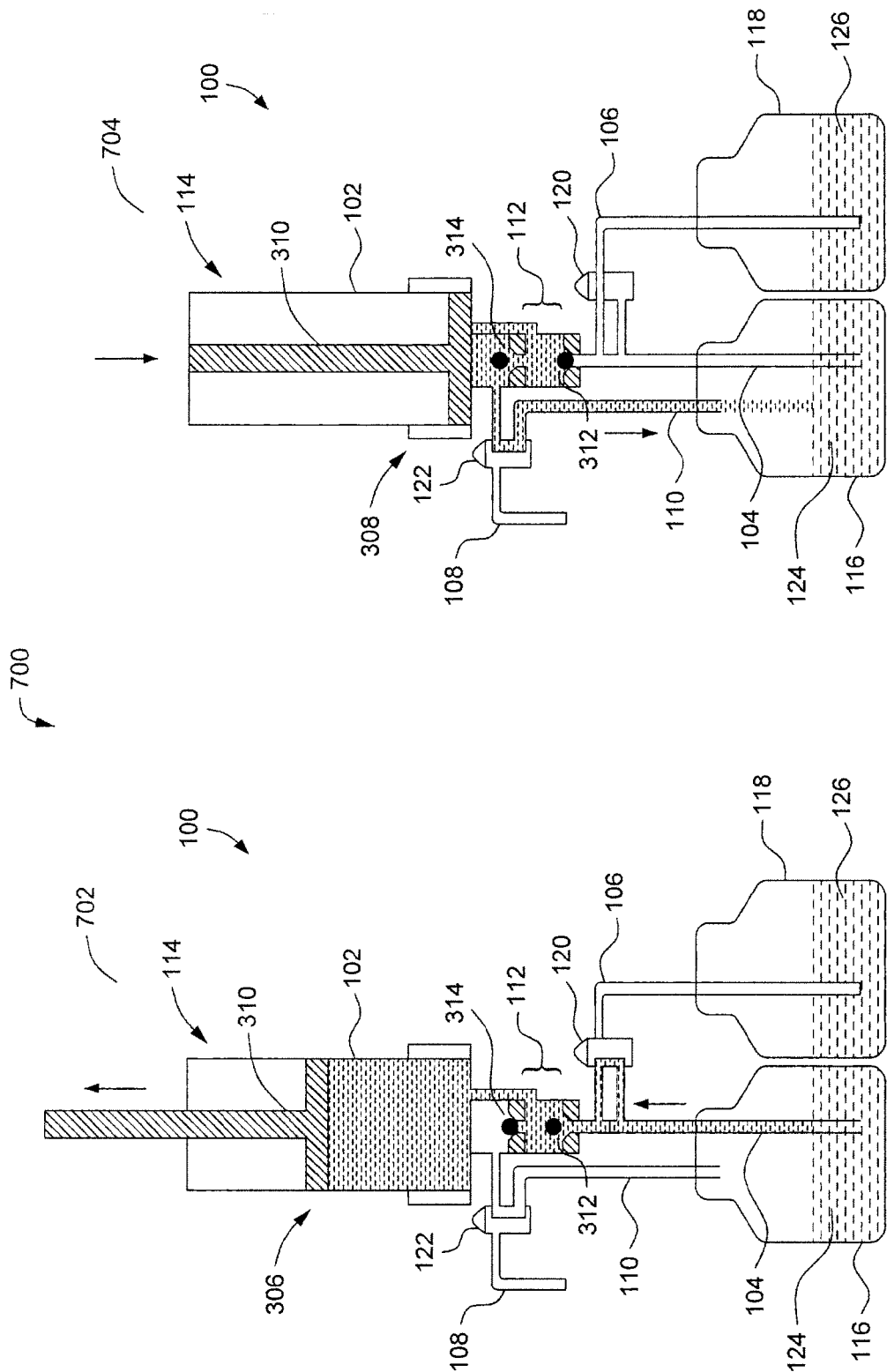

FLUID DISPENSING DEVICE INCLUDING A VALVE ASSEMBLY FLUIDICALLY COUPLED TO A FIRST AND SECOND INLET, AND TO A FIRST AND SECOND OUTLET

This application claims priority from Indian Application No. 2262/DEL/2014 filed on 8 Aug. 2014, the contents of which are to be taken as incorporated herein by this reference.

BACKGROUND

The invention relates generally to a fluid dispensing device and more particularly, to a fluid dispensing device adapted to dispense predetermined and accurate quantities of fluids from one or more containers.

Several applications require fluid dispensing devices that can repeatedly dispense metered quantity of fluid from a container. In such applications, the fluid being dispensed by the device may be a chemical reagent, corrosive, toxic and/or a substantially expensive fluid and the like.

The conventional fluid dispensing devices typically include single inlet to dispense a fluid and do not allow a container filling feature. In certain conditions, as the container gets empty, the dispensing device needs to be dismounted from the container. The container is then refilled and then the fluid dispensing device needs to be re-mounted to continue with the dispensing operation. Also, purging is required to be done before re-starting the dispensing operation. Further, in cases where sterilization or autoclaving of the fluid dispensing device is needed, the device has to be dismounted from the container. The dismounted device is then required to be mounted on to the container having distilled water for rinsing and is again dismounted from the distilled water container.

Moreover, in some applications, dilution of a fluid/reagent is required. For example, concentrated acids may be required to be diluted with distilled water. Most of the conventional dispensing devices include single inlet and are not capable of handling more than one fluid at a time. Thus, after dispensing the concentrated acid from the acid container, water or diluting agent has to be separately dispensed using another fluid dispensing device.

Therefore, improved device and method for dispensing accurate volume of one or more fluids from a container is desirable.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

According to some examples of the present disclosure, a fluid dispensing device is provided. The fluid dispensing device includes a dispensing cylinder and a first inlet and a second inlet configured to facilitate intake of the one or more fluids into the dispensing cylinder. The first inlet is disposed within a first container on which the fluid dispensing device is mounted. The first inlet and the second inlet are configured to facilitate intake of only one fluid into the dispensing cylinder at a given point in time. The fluid dispensing device also includes a first outlet and a second outlet configured to dispense the one or more fluids. The first outlet and the second outlet are configured to dispense only one fluid out of the dispensing cylinder at a given point in time. The fluid dispensing device further includes a valve assembly fluidically coupled to the first inlet and the second inlet, and to the first outlet and the second outlet. The valve assembly is configured to control flow of the fluids within and/or out of the dispensing cylinder.

According to additional examples of the present disclosure, a method for dispensing one or more fluids is provided. The method includes coupling a dispensing device to a container, the dispensing device having a dispensing cylinder, an inlet fluid path, an outlet fluid path, and a valve assembly fluidically coupled to the inlet and outlet fluid paths. The method also includes operating the valve assembly to control flow of the one or more fluids within and/or out of the dispensing cylinder. The valve assembly is configured to facilitate intake and dispensing of only one fluid within and/or out of the dispensing cylinder at a given point in time.

According to still further examples of the present disclosure, a fluid dispensing device is provided. The fluid dispensing device includes a dispensing cylinder and a first inlet and a second inlet configured to facilitate intake of one or more fluids into the dispensing cylinder. The first inlet is disposed within a first container on which the fluid dispensing device is mounted. The first inlet and the second inlet are configured to facilitate intake of only one fluid into the dispensing cylinder at a given point in time. The fluid dispensing device also includes a first outlet and a second outlet configured to dispense the one or more fluids and a piston assembly coupled to the dispensing cylinder. The first outlet and the second outlet are configured to dispense only one fluid out of the dispensing cylinder at a given point in time. The piston assembly is configured to facilitate intake of a fluid from either of the first inlet and the second inlet when the piston assembly is in a first position. The piston assembly is configured to dispense the fluid from either of the first outlet and the second outlet when the piston assembly is in a second position. The fluid dispensing device further includes a valve assembly fluidically coupled to the first inlet and the second inlet, and to the first outlet and the second outlet. The valve assembly is configured to control flow of the one or more fluids within and/or out of the dispensing cylinder.

BRIEF DESCRIPTION OF THE FIGURES

FIG. 3A and FIG. 3B illustrate an example configuration of a piston assembly arranged in accordance with at least some embodiments described herein;

FIG. 4A and FIG. 4B are example configurations of the device of FIG. 1 illustrating second fluid dispensing operation arranged in accordance with at least some embodiments described herein;

FIG. 6A and FIG. 6B are example configurations of the device of FIG. 1 illustrating first fluid dispensing operation arranged in accordance with at least some embodiments described herein; and FIG. 7A and FIG. 7B are example configurations of the device of FIG. 1 illustrating first fluid recirculation operation arranged in accordance with at least some embodiments described herein.

DETAILED DESCRIPTION

Figure 1:
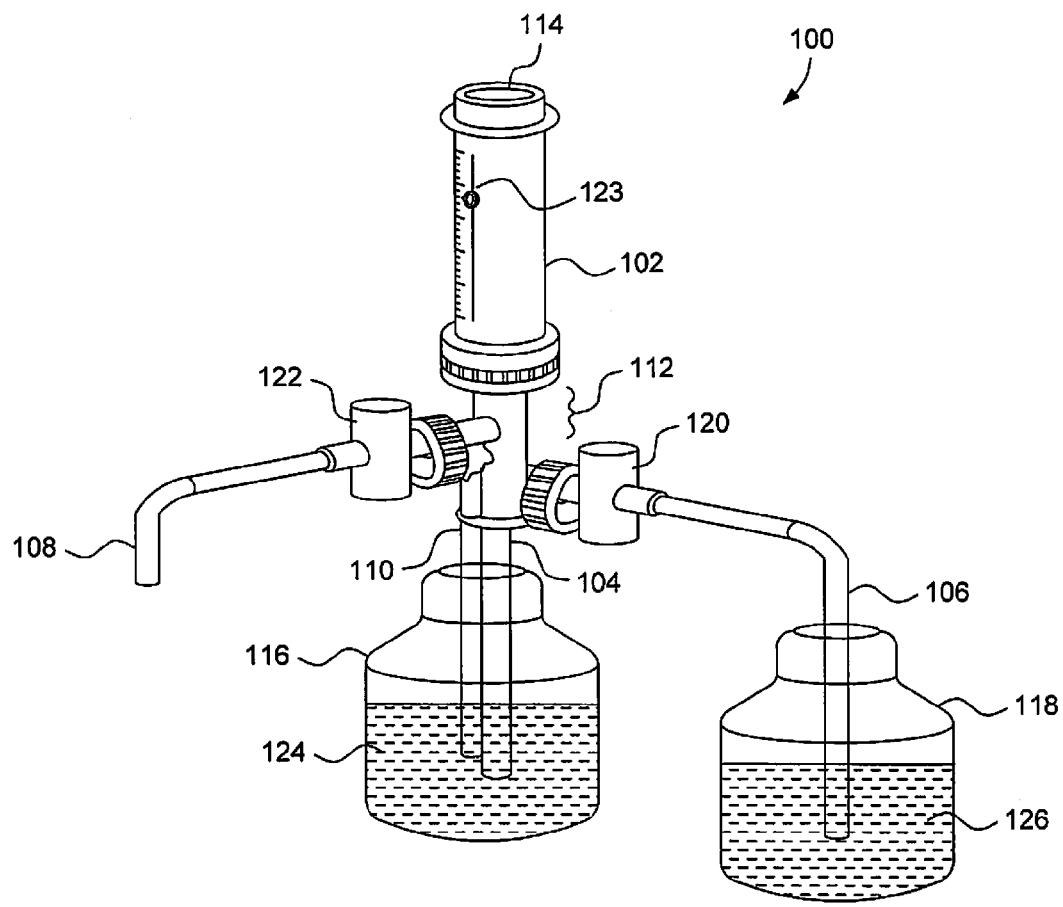
FIG. 1 is a schematic diagram illustrating an example fluid dispensing device for dispensing one or more fluids arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Example embodiments of the present disclosure are generally directed to techniques of dispensing fluids. The embodiments described below provide a fluid dispensing device adapted to be mounted on top of a container having a fluid. The fluid dispensing device includes dual inlets to facilitate intake of one or more fluids and dual outlets to dispense either of the one or more fluids. The dual inlets and the dual outlets are configured to facilitate intake and dispensing of only one fluid within and/or out of the dispensing cylinder at a given point in time. The proposed technique facilitates easy refilling of the container, rinsing of the fluid dispensing device, dispensing one or more fluids easily through the same fluid dispensing device and mixing of two fluids without dislodging the fluid dispensing device from the container.

Referring now to FIG. 1, an example fluid dispensing device 100 configured to dispense one or more fluids is provided. The fluid dispensing device 100 includes a dispensing cylinder 102, a first inlet 104 and a second inlet 106. The fluid dispensing device 100 also includes a first outlet 108, a second outlet 110 and a valve assembly 112. Examples of the fluids include, but are not limited to, a chemical reagent, corrosive, toxic and/or a substantially expensive fluid, or combinations thereof.

The dispensing cylinder 102 is configured to hold either of the one or more fluids coming into the fluid dispensing device 100 through one of the first inlet 104 and second inlet 106 and dispensed through one of the first outlet 108 and second outlet 110. In one embodiment, the dispensing cylinder 102 includes a piston assembly 114 configured to control a volume of the fluids.

The first inlet 104 and the second inlet 106 are configured to facilitate intake of one of the two fluids into the dispensing cylinder 102. It should be noted that the first inlet 104 and the second inlet 106 are configured to facilitate intake of only one fluid into the dispensing cylinder 102 at a given point in time. In one embodiment, the first inlet 104 is disposed within a first container 116 on which the fluid dispensing device 100 is mounted. In another embodiment, the second inlet 106 is disposed in a second container 118. In one example embodiment, the first container 116 and the second container 118 contain same fluid. In another example embodiment, the first container 116 and the second container 118 contain different fluids. The first outlet 108 is configured to dispense one of the two fluids out of the dispensing device 100 and the second outlet 110 is also configured to dispense one of the two fluids into the first container 116. Again, the first outlet 108 and the second outlet 110 are configured to dispense only one fluid out of the dispensing cylinder 102 at a given point in time.

In one example, the piston assembly 114 includes a piston disposed within the dispensing cylinder 102. The piston is configured to move vertically inside the dispensing cylinder 102 such that as the piston is moved in an upwards direction, a desired volume of fluid comes into the dispensing cylinder 102 from either of the first inlet 104 and the second inlet 106. Further, as the piston is moved in a downward direction, the aspirated fluid is dispensed out through one of the first outlet 108 and second outlet 110.

The valve assembly 112 is fluidically coupled to the first inlet 104 and the second inlet 106, and to the first outlet 108 and the second outlet 110. In this embodiment, the valve assembly 112 is configured to control flow of the fluids within and/or out of the dispensing cylinder 102. In one embodiment, the valve assembly 112 includes an inlet valve (not shown) and an output valve (not shown) fluidically coupled to the dispensing cylinder 102. In another embodiment, the valve assembly 112 includes an inlet diverter valve 120 configured to control flow of the fluids through one of the first inlet 104 and the second inlet 106 and an output diverter valve 122 configured to control flow of the fluids through one of the first outlet 108 and the second outlet 110. The details and operation of the valve assembly 112 will be described below with reference to FIGS. 3A and 3B-FIGS. 7A and 7B.

In some embodiments, the fluid dispensing device 100 includes a volume regulation unit 123 configured to control the volume of the fluids dispensed from the fluid dispensing device 100. In one embodiment, the volume regulation unit is an analog unit. In this embodiment, the volume regulation unit 123 includes a calibration scale and a volume adjustment knob for setting the desired volume of the fluids to be dispensed.

In another embodiment, the volume regulation unit 123 is a digital unit. In this embodiment, the volume regulation unit 123 includes a motor operated piston and an electronic panel for setting desired volume of the fluids to be dispensed and a digital display to indicate the amount of volume dispensed.

In certain embodiments, the fluid dispensing device 100 includes a coupling mechanism configured to couple the fluid dispensing device 100 to the top surface of the first container 116. In one embodiment, the coupling mechanism includes an adaptor configured to allow the fluid dispensing device 100 to set firmly on to the first container 116. In one example embodiment, the adaptor includes a set of threads formed on an inner surface of the fluid dispensing device 100 to lock with a corresponding set of threads provided on an outer surface of the first container 116.

In one embodiment, the fluid dispensing device 100 is configured to facilitate filling of the first container 116 with a fluid when the inlet diverter valve 120 is in open position and the output diverter valve 122 is in closed position. In another embodiment, the fluid dispensing device 100 is configured to facilitate mixing of a first fluid 124 stored in the first container 116 and a second fluid 126 stored in the second container 118 when the inlet diverter valve 120 is in closed position and the output diverter valve 122 is in open position.

In some embodiments, the fluid dispensing device 100 is configured to facilitate recirculation of the first fluid 124 from the first container 116 when the inlet diverter valve 120 and the output diverter valve 122 are in closed position. In yet another embodiment, the fluid dispensing device 100 is configured to facilitate dispensing of the second fluid 126 from the second container 118 through the first outlet 108 when the inlet diverter valve 120 and the output diverter valve 122 are in open position.

Figure 2:
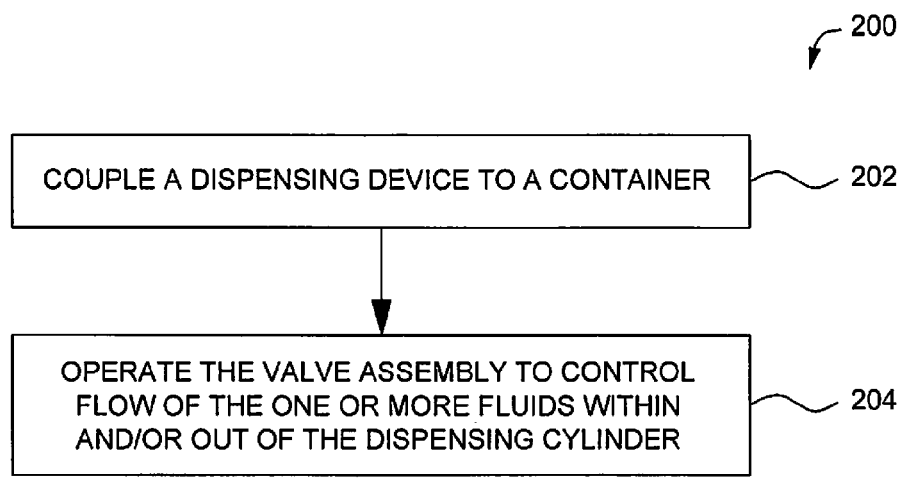
FIG. 2 illustrates an example process for dispensing a fluid arranged in accordance with at least some embodiments described herein.

FIG. 2 illustrates an example process 200 for dispensing one or more fluids arranged in accordance with at least some embodiments described herein. At block 202, a dispensing device is coupled to a container. The dispensing device includes a dispensing cylinder, an inlet fluid path, an outlet fluid path, and a valve assembly fluidically coupled to the inlet and outlet fluid paths. In one embodiment, the inlet fluid path includes a first inlet and a second inlet and the outlet fluid path includes a first outlet and a second outlet. In this embodiment, the first inlet and the second inlet are configured to facilitate intake of only one fluid into the dispensing cylinder at a given point in time. Also, the first outlet and the second outlet are configured to dispense only one fluid out of the dispensing cylinder at a given point in time. In one embodiment, the first inlet is disposed within a first container on which the fluid dispensing device is mounted. In another embodiment, the second inlet is disposed in a second container.

At block 204, the valve assembly is operated to control flow of the fluid within and/or out of the dispensing cylinder. In one embodiment, the valve assembly includes at least an inlet valve, an output valve, an inlet diverter valve and an output diverter valve. In one embodiment, the inlet diverter valve is configured to control flow of the fluid through one of the first inlet and the second inlet and the output diverter valve is configured to control flow of the fluid through one of the first outlet and the second outlet. In operation, at least one of the inlet valve, output valve, inlet diverter valve and the output diverter valve is operated to control the flow of fluids.

In one embodiment, the inlet diverter valve is maintained in an open position and the output diverter valve is maintained in a closed position to facilitate filling of the first container with a fluid. In another embodiment, the inlet diverter valve is maintained in closed position and the output diverter valve is maintained in open position to facilitate mixing of different fluids from the first container and the second container. In another embodiment, the inlet diverter valve and the output diverter valve are maintained in closed position to facilitate recirculation of the fluid from the first container. In another embodiment, the inlet diverter valve and the output diverter valve are maintained in open position to facilitate dispensing of the second fluid from the second container through the first outlet. The operation of the valve assembly to control the flow of fluids in different modes of operation will be described in a greater detail below.

FIGS. 3A and 3B illustrate example configurations 300 of a piston assembly 114 of the fluid dispensing device 100 arranged in accordance with at least some embodiments described herein. In the illustrated embodiment, reference numerals 302 and 304 illustrate configurations of the piston assembly 114 in a first position 306 and a second position 308 respectively.

In the example configuration 302, the piston assembly 114 is in the first position 306. In this embodiment, a piston 310 of the piston assembly 114 is moved vertically upwards inside the dispensing cylinder 102. Further, an inlet valve 312 of the valve assembly 112 is maintained in open position and an output valve 314 of the valve assembly 112 is maintained in closed position. Such configuration allows intake of fluid from either of the two inlets 104 or 106.

In the example configuration 304, the piston assembly 114 is in the second position 308. In this embodiment, the piston 310 is moved vertically downwards inside the dispensing cylinder 102. Here, the inlet valve 312 is maintained in closed position and the output valve 314 is maintained in open position that allows the fluid to dispense out of the dispensing cylinder 102 through either of the two outlets 108 or 110. In this embodiment, each of the inlet valve 312 and the output valve 314 includes a glass ball 316 and a glass seat 318. The glass ball and glass seat mechanism provides one or more hollow passageways going sideways through the dispensing cylinder 102 such that the fluid can dispense through or fill into the dispensing cylinder 102 depending on the piston assembly 114 position.

FIGS. 4A and 4B illustrate an example mode of operation 400 of the fluid dispensing device 100 of FIG. 1 arranged in accordance with at least some embodiments described herein. In this embodiment, two different modes of operation generally represented by reference numerals 402 and 404 illustrate movement of the second fluid 126 into the dispensing cylinder 102 and being dispensed out of the dispensing cylinder 102 via the first outlet 108 respectively.

In this embodiment, the fluid dispensing device 100 is configured to dispense the second fluid 126 from the second container 118 through the first outlet 108 when the inlet diverter valve 120 and the output diverter valve 122 are in open position. As illustrated in example mode 402, the piston 310 is moved vertically upward inside the dispensing cylinder 102 setting the piston assembly 114 in the first position 306, the inlet valve 312 is in the open position and the output valve 314 is in closed position. This configuration of the fluid dispensing device 100 facilitates intake of second fluid 126 from the second container 118 into the dispensing cylinder 102 via the second inlet 106.

Further, as illustrated in example mode 404, the piston 310 is moved vertically downward inside the dispensing cylinder 102 setting the piston assembly 114 in the second position 308, the inlet valve 312 in closed position and the output valve 314 in open position. This configuration facilitates dispensing of the second fluid 126 from the dispensing cylinder 102 via first outlet 108.

In one example, the fluid dispensing mode 400 of the fluid dispensing device 100 of FIG. 1 is used in applications requiring rinsing of the fluid dispensing device 100. In this example, distilled water used for rinsing is provided as the second fluid 126 in the second container 118 and is dispensed out via first outlet 108 to rinse the fluid dispensing device 100 using fluid dispensing mode 400. This avoids the need to dismount the fluid dispensing device 100 from the first container 116 containing chemical reagent as first fluid 124.

Figures 5A, 5B:
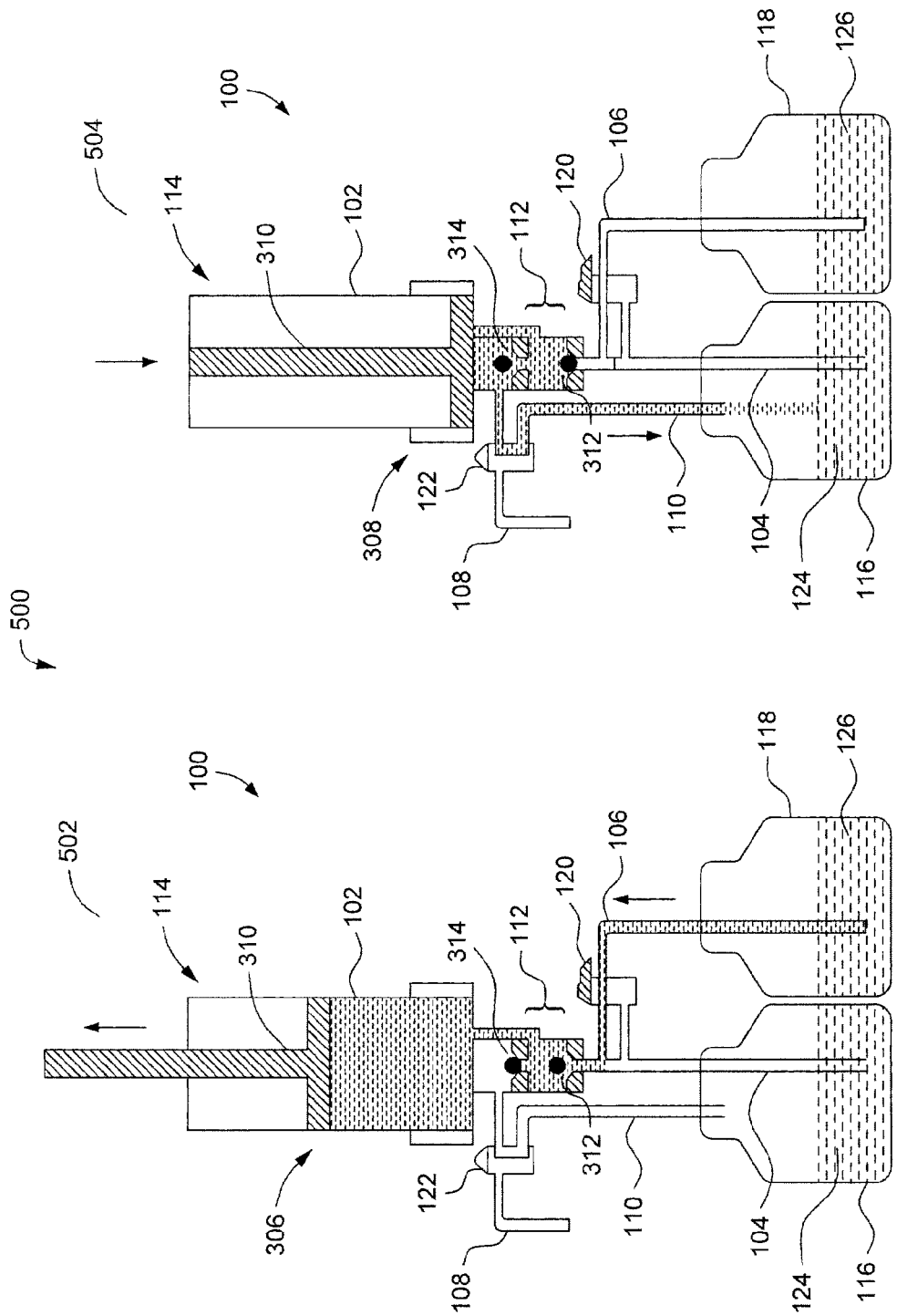
FIG. 5A and FIG. 5B are example configurations of the device of FIG. 1 illustrating container filling operation arranged in accordance with at least some embodiments described herein.

In another example embodiment, the fluid dispensing mode 400 is used in applications requiring dilution of concentrated acids with distilled water. In this example embodiment, known amount of distilled water used as diluting agent is provided as second fluid 126 in the second container 118 which in turn is dispensed into the known amount of concentrated acid stored as first fluid 124 into the first container 116 using fluid dispensing mode 400 as explained above. This avoids the need for diluting agent to be dispensed separately using another fluid dispensing device FIGS. 5A and 5B illustrate another example mode of operation 500 of the fluid dispensing device 100 of FIG. 1 arranged in accordance with at least some embodiments described herein. In the illustrated embodiment, two different modes of operation generally represented by reference numerals 502 and 504 illustrate the movement of the second fluid 126 into the dispensing cylinder 102 and out of the dispensing cylinder 102 via the second outlet 110 respectively.

In this embodiment, the fluid dispensing device 100 is configured to facilitate filling of the first container 116 with a fluid when the inlet diverter valve 120 is in open position and the output diverter valve 122 is in closed position. As illustrated in example mode 502, the piston 310 is moved vertically upwards inside the dispensing cylinder 102 setting the piston assembly 114 in the first position 306, the inlet valve 312 in open position and the output valve 314 in closed position. This configuration of the fluid dispensing device 100 facilitates intake of second fluid 126 from the second container 118 into the dispensing cylinder 102 via the second inlet 106. Further, as illustrated in example mode 504, the piston 310 is moved vertically downwards within the dispensing cylinder 102 setting the piston assembly 114 in the second position 308, the inlet valve 312 closed position and the output valve in open position to facilitate dispensing of the second fluid 126 into the first container 116 via the second outlet 110.

In one example embodiment, the fluid dispensing mode 500 of the fluid dispensing device 100 of FIG. 1 is used in applications requiring container filling operation without the need to dismount the fluid dispensing device 100 from the first container 116.

FIGS. 6A and 6B illustrate another example mode of operation 600 of the fluid dispensing device 100 of FIG. 1 arranged in accordance with at least some embodiments described herein. In the illustrated embodiment, two different modes of operation generally represented by reference numerals 602 and 604 illustrate movement of the first fluid 124 into the dispensing cylinder 102 and dispensed out of the dispensing cylinder 102 via the first outlet 108 respectively.

In this embodiment, the device 100 is configured to facilitate dispensing of the first fluid 124 from the first container 116 when the inlet diverter valve 120 is maintained in closed position and the output diverter valve 122 is maintained in open position. As illustrated in example fluid dispensing mode 602, the piston 310 is moved vertically upwards inside the dispensing cylinder 102 setting the piston assembly 114 in the first position 306, the inlet valve 312 in open position and the output valve 314 in closed position. This configuration of the fluid dispensing device 100 facilitates intake of first fluid 124 from the first container 116 into the dispensing cylinder 102 via the first inlet 104.

Further, as illustrated in example mode 604, the piston 310 is moved vertically downwards inside the dispensing cylinder 102 setting the piston assembly 114 in the second position 308, the inlet valve 312 in closed position and the output valve 314 in open position to facilitate dispensing of the first fluid 124 from the first outlet 108.

FIGS. 7A and 7B illustrate another example mode of operation 700 of the fluid dispensing device 100 of FIG. 1 arranged in accordance with at least some embodiments described herein. In the illustrated embodiment, two different modes of operation generally represented by reference numerals 702 and 704 illustrate the movement of first fluid 124 into the dispensing cylinder 102 and out of the dispensing cylinder 102 via the second outlet 110 respectively.

In this embodiment, the device 100 is configured to facilitate recirculation of the first fluid 124 from the first container 116 when the inlet diverter valve 120 and the output diverter valve 122 are in closed positions. As illustrated in example mode 702, the piston 310 is moved vertically upwards inside the dispensing cylinder 102 setting the piston assembly 114 in the first position 306, the inlet valve 312 in open position and the output valve 314 in closed position. This configuration of the fluid dispensing device 100 facilitates intake of the first fluid 124 into the dispensing cylinder 102 via the first inlet 104.

Further, as illustrated in example mode 704, the piston 310 is moved vertically downwards inside the dispensing cylinder 102 setting the piston assembly 114 in the second position 308, the inlet valve 312 in closed position and the output valve 314 in open position to facilitate recirculation of the first fluid 124 from the dispensing cylinder 102 into the first container 116 via second outlet 110.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A fluid dispensing device, the device comprising:
   a dispensing cylinder;
   a first inlet and a second inlet configured to facilitate intake of one or more fluids into the dispensing cylinder, wherein the first inlet is disposed within a first container on which the fluid dispensing device is mounted and wherein the first inlet and the second inlet are configured to facilitate intake of only one fluid into the dispensing cylinder at a given point in time;
   a first outlet and a second outlet configured to dispense the one or more fluids, wherein the first outlet and the second outlet are configured to dispense only one fluid out of the dispensing cylinder at a given point in time; and
   a valve assembly fluidically coupled to the first inlet and the second inlet, and to the first outlet and the second outlet, wherein the valve assembly is configured to control flow of the fluids within and/or out of the dispensing cylinder.

2. The fluid dispensing device of claim 1, wherein the dispensing cylinder comprises a piston assembly configured to control a volume of the fluids.

3. The fluid dispensing device of claim 1, wherein the first outlet is configured to dispense at least one fluid out of the fluid dispensing device and the second outlet is configured to dispense the at least one fluid into the first container.

4. The fluid dispensing device of claim 1, further comprising a volume regulation unit to control the volume of the fluids dispensed from the fluid dispensing device.

5. The fluid dispensing device of claim 1, wherein the second inlet is disposed in a second container.

6. The fluid dispensing device of claim 5, wherein the first container and the second container contains a same type of fluid.

7. The fluid dispensing device of claim 5, wherein the first container and the second container contains different types of fluids.

8. The fluid dispensing device of claim 1, wherein the valve assembly comprises:
   an inlet valve and an output valve fluidically coupled to the dispensing cylinder; and
   an inlet diverter valve configured to control flow of the fluids through one of the first inlet and the second inlet, and an output diverter valve configured to control flow of the fluids through one of the first outlet and the second outlet.

9. The fluid dispensing device of claim 8, wherein the device is configured to facilitate filling of the first container with a fluid when the inlet diverter valve is in an open position and the output diverter valve is in a closed position.

10. The fluid dispensing device of claim 9, wherein the device is configured to facilitate recirculation of the fluid from the first container when the inlet diverter valve and the output diverter valve are in the closed position.

11. The fluid dispensing device of claim 9, wherein the device is configured to facilitate dispensing of the second fluid from the second container through the first outlet when the inlet diverter valve and the output diverter valve are in the open position.

12. A fluid dispensing device, the device comprising:
   a dispensing cylinder;
   a first inlet and a second inlet configured to facilitate intake of one or more fluids into the dispensing cylinder, wherein the first inlet is disposed within a first container on which the fluid dispensing device is mounted, and wherein the first inlet and the second inlet are configured to facilitate intake of only one fluid into the dispensing cylinder at a given point in time;
   a first outlet and a second outlet configured to dispense the one or more fluids, wherein the first outlet and the second outlet are configured to dispense only one fluid out of the dispensing cylinder at a given point in time;
   a piston assembly coupled to the dispensing cylinder, wherein the piston assembly is configured to facilitate intake of a fluid from either of the first inlet and the second inlet when the piston assembly is in a first position, and wherein the piston assembly is configured to dispense the fluid from either of the first outlet and the second outlet when the piston assembly is in a second position; and a valve assembly fluidically coupled to the first inlet and the second inlet, and to the first outlet and the second outlet, wherein the valve assembly is configured to control flow of the one or more fluids within and/or out of the dispensing cylinder.

13. The fluid dispensing device of claim 12, wherein the second inlet is disposed in a second container.

* * * * *